United States Patent
Parmar et al.

(10) Patent No.: US 9,191,352 B2
(45) Date of Patent: Nov. 17, 2015

(54) ON DEMAND LOCATION SHARING

(75) Inventors: Siddhartha Parmar, Seattle, WA (US); Seung-Hae Park, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 335 days.

(21) Appl. No.: 13/087,397

(22) Filed: Apr. 15, 2011

(65) Prior Publication Data

US 2012/0265823 A1 Oct. 18, 2012

(51) Int. Cl.
*H04L 12/58* (2006.01)
*H04W 4/02* (2009.01)
*H04W 12/02* (2009.01)
*G01S 5/00* (2006.01)
*H04W 4/20* (2009.01)

(52) U.S. Cl.
CPC .......... *H04L 51/20* (2013.01); *H04L 51/38* (2013.01); *H04W 4/02* (2013.01); *H04W 4/206* (2013.01); *H04W 12/02* (2013.01); *G01S 5/0072* (2013.01); *H04W 4/20* (2013.01)

(58) Field of Classification Search
CPC ......... H04L 51/20; H04L 51/38; H04L 51/12; H04L 67/18; H04W 12/02; H04W 4/02; H04W 4/023; H04W 4/206; G06Q 30/02; G06Q 30/0261; G06Q 10/025; G06Q 10/06311
USPC ......... 709/203, 206, 223, 219, 224, 217, 227; 455/411, 456, 456.1, 456.2, 414, 465.1
See application file for complete search history.

(56) References Cited

U.S. PATENT DOCUMENTS

| | | | |
|---|---|---|---|
| 6,405,123 B1* | 6/2002 | Rennard et al. | 701/410 |
| 6,615,131 B1* | 9/2003 | Rennard et al. | 701/420 |
| 7,139,820 B1* | 11/2006 | O'Toole et al. | 709/223 |
| 7,203,502 B2* | 4/2007 | Wilson et al. | 455/456.1 |
| 7,451,186 B2 | 11/2008 | Morinigo et al. | |
| 7,532,899 B2* | 5/2009 | Wilson et al. | 455/456.1 |
| 7,707,256 B2* | 4/2010 | Rollin et al. | 709/206 |
| 8,577,990 B2* | 11/2013 | Ge | 709/217 |

(Continued)

FOREIGN PATENT DOCUMENTS

WO 2010009328 A2 1/2010

OTHER PUBLICATIONS

Perez, Sarah, "Glympse: Real-Time, Private Location-Tracking May be the Winning Formula",Retrieved at<<http://www.readwriteweb.com/archives/glympse_real-time_private_location-tracking_comes_to_facebook_twitter.php>>, Apr. 16, 2010, pp. 3.

(Continued)

*Primary Examiner* — Ramy M Osman
(74) *Attorney, Agent, or Firm* — Julie Kane Akhter; Danielle Johnston Holmes; Micky Minhas

(57) ABSTRACT

An on demand location sharing technique protects the location of a client device until the user of the client device elects to share the location. The location of the user device is not broadcasted to other user devices. In an on demand request for the location or from initiation from the user, the location of the user device is shared with other users. In an embodiment, the on demand location sharing technique may be used in a messaging service application used in wireless devices.

20 Claims, 10 Drawing Sheets

(56) References Cited

U.S. PATENT DOCUMENTS

| | | | |
|---|---|---|---|
| 8,769,149 B2 * | 7/2014 | Sidi et al. | 709/245 |
| 8,909,248 B2 * | 12/2014 | Phillips et al. | 455/456.1 |
| 9,002,957 B2 * | 4/2015 | Turner et al. | 709/206 |
| 2002/0077080 A1 * | 6/2002 | Greene | 455/456 |
| 2002/0102989 A1 * | 8/2002 | Calvert et al. | 455/414 |
| 2002/0169650 A1 * | 11/2002 | Dougherty et al. | 705/8 |
| 2004/0039579 A1 * | 2/2004 | Chithambaram et al. | 705/1 |
| 2004/0192299 A1 | 9/2004 | Wilson et al. | |
| 2004/0203603 A1 * | 10/2004 | Pierce et al. | 455/411 |
| 2004/0203901 A1 * | 10/2004 | Wilson et al. | 455/414.1 |
| 2005/0124293 A1 * | 6/2005 | Alicherry et al. | 455/502 |
| 2006/0099970 A1 * | 5/2006 | Morgan et al. | 455/456.6 |
| 2006/0123008 A1 | 6/2006 | Stillion et al. | |
| 2006/0227047 A1 * | 10/2006 | Rosenberg | 342/357.13 |
| 2007/0087731 A1 * | 4/2007 | Karlsson et al. | 455/414.1 |
| 2007/0202844 A1 * | 8/2007 | Wilson et al. | 455/404.2 |
| 2008/0139218 A1 * | 6/2008 | Duan | 455/456.2 |
| 2008/0268870 A1 * | 10/2008 | Houri | 455/456.1 |
| 2008/0287112 A1 * | 11/2008 | Mullen | 455/414.3 |
| 2009/0047972 A1 | 2/2009 | Neeraj | |
| 2009/0049154 A1 * | 2/2009 | Ge | 709/217 |
| 2009/0100037 A1 * | 4/2009 | Scheibe | 707/5 |
| 2009/0170525 A1 * | 7/2009 | Baghdasaryan | 455/456.1 |
| 2009/0286513 A1 * | 11/2009 | Wilson et al. | 455/411 |
| 2009/0292782 A1 * | 11/2009 | Kim et al. | 709/206 |
| 2009/0319616 A1 * | 12/2009 | Lewis et al. | 709/206 |
| 2010/0279713 A1 | 11/2010 | Dicke | |
| 2010/0323716 A1 * | 12/2010 | Jaffri | 455/456.1 |
| 2011/0070865 A1 * | 3/2011 | Nelson et al. | 455/456.1 |
| 2011/0111726 A1 * | 5/2011 | Kholaif et al. | 455/456.2 |
| 2011/0143774 A1 * | 6/2011 | McNamara et al. | 455/456.2 |
| 2011/0170693 A1 * | 7/2011 | Thomson et al. | 709/219 |

OTHER PUBLICATIONS

Sacramento, et al., "A Privacy Service for Location-Based Collaboration among Mobile Users", Retrieved at <<http://www.scielo.br/pdf/jbcos/v14n4/a05v14n4.pdf>>, Dec. 29, 2009, pp. 17.

Muthukrishnan, et al., "WLAN Location Sharing through a Privacy Observant Architecture", Retrieved at <<http://doc.utwente.nl/59910/1/Muthukrishnan06wlan.pdf>>, 2006, pp. 10.

Hendrix, Phil, "Location: The Epicenter of Mobile Innovation in 2010", Retrieved at <<http://pro.gigsom.com/2010/02/location-the-epicenter-of-mobile-innovation/>>, Feb. 2010, pp. 60.

"Google Latitude". Retrieved at <<http://www.google.com/mobile/latitude/>>, 2011, pp. 2.

"Foursquare", Retrieved at <<http://www.foursquare.com/>>, 2011, pp. 1.

"Facebook Places", Retrieved at <<http://www.facebook.com/places/>>, 2011, pp. 1.

"Gowalla", Retrieved at <<http://www.gowalla.com/>>, 2011, pp. 1.

"Loopt", Retrieved at <<http://www.loopt.com/>>, 2011, pp. 1.

"Where", Retrieved at <<http://where.com/locations/ttngj4e7/places/>>, 2011, pp. 1.

"Shopkick", Retrieved at <<http://www.shopkick.com/>>, 2011, pp. 1.

"Brightkite", Retrieved at <<http://www.brightkite.com/>>, 2011, pp. 1.

* cited by examiner

ON DEMAND LOCATION SHARING

BACKGROUND

There is an increased trend for wireless devices to employ location-based services that determine the location of a user in order to provide the user with information and services associated with their location. Often, the location-based service relies on a geographical location of the wireless device which may be obtained automatically through a satellite-based receiver in the wireless device or inferred from a location tracking application. In some instances, the user loses the ability to guard the privacy of their location when utilizing a wireless device configured with services that may determine and track their location automatically.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user of a wireless device controls the distribution of a location associated with the user's wireless device in order to guard the privacy of the user's location. The user of the wireless device shares its location through a location sharing mechanism. The user awaits requests from other wireless devices for the user's location and, at the user's discretion, the request may be granted or denied through an electronic consent. The on demand nature of the request assures that the user has control over the distribution of the location rather than having the location broadcasted automatically to other wireless devices without the user's knowledge or control.

In addition, once a requesting user of a wireless device obtains the location of another user of a wireless device, the requesting user may use the location to search for and select meeting places in the vicinity of the known location. The requesting user may then transmit these meeting places to the other user for their consideration.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
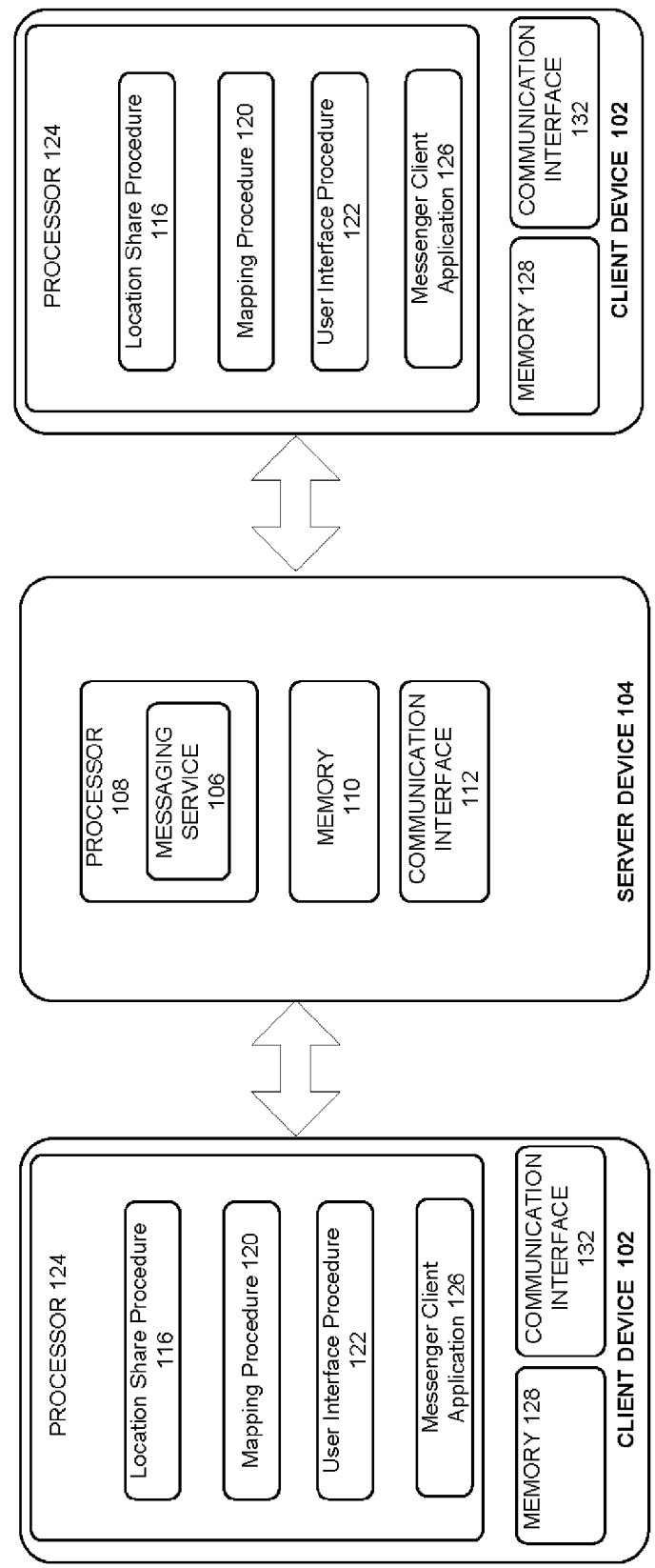
FIG. 1 illustrates an exemplary system for on demand location sharing.

Generally, embodiments of an on demand location sharing technology and technique that enables a user to privately share the location of their wireless device is described herein. A location is the geographical position on earth of a wireless device. The location of a wireless device is based on a known coordinate system (e.g., WGS84) that is used in a particular positioning system. Examples of such positioning systems may include the global positioning system (GPS) and the global system for mobile communications (GSM). For example, the location of a wireless device having a satellite receiver (e.g., GPS receiver) may be determined from the satellite receiver and expressed in terms of longitude, latitude, and altitude, or in similar terms. Alternatively, a wireless device not having a satellite receiver may determine its location using radio signal transmissions from the client device to a neighboring cell tower or access point. Other techniques for determining the location of a wireless device may be employed as well.

The on demand location sharing technique transmits a location request message, from user A, to request the location of user B. User A and user B are both users of a wireless device. User B may share its location by communicating an affirmative location response message or deny the request by communicating a NO THANKS message. Once User A obtains an affirmative location response message, User A may search for meeting places within the vicinity of User B's location. User A may transmit selected meeting places through a share a place message that is transmitted to User B. User B may view the meeting places and a means may be provided for User B to obtain directions to a meeting place of interest. Additionally, either user may manually elect to transmit their location at a particular point in time to another user through a share my location message.

In an embodiment, the on demand location sharing technique includes a location sharing procedure. The location sharing procedure facilitates the messaging between users to retrieve the location of a client device. In addition, the location sharing procedure facilitates searching for meeting places in the vicinity of a desired location. In an embodiment, the search for meeting places may be facilitated using a search engine located on a web server accessed through a networked communication framework.

In one or more embodiments, the location sharing procedure may be part of a messaging client application, such as an instant messaging application, a short message service (SMS), or the like. In one or more embodiments, the location sharing procedure may utilize other procedures, such as a mapping procedure to generate maps of a location, and a user interface procedure that generates graphical user interfaces containing windows, icons, menus, and related text to obtain user input or to display information.

Attention now turns to a more detailed description of the on demand location sharing technology.

FIG. 1 illustrates an exemplary diagram of a system 100 for on demand location sharing. As shown, the system 100 may include one or more client devices 102 and at least one server device 104. The client device 102 and the server devices 104 may be any type of electronic device such as without limitation a wireless device, a personal digital assistant, a mobile computing device, a smart phone, a cellular telephone, a handset, a pager, a messaging device, a computer, a personal computer, a desktop computer, a laptop computer, a server, and the like or combination thereof.

The client devices 102 are in communication with the server device 104 through a communication framework that may include various types of communications media as shown by the arrows which may involve the uni-directional or bi-directional exchange of information.

The server device 104 may contain a messenger service 106 that facilitates the transmission of communications between the client devices 102. The messenger service 106 may be an instant messaging service, such as without limitation, the Windows Live® Messenger, that provides the transport mechanism for transmitting messages between the client devices 102. In addition, the server device 104 may contain other computing components, such as processor 108, a memory 110, and a communication interface 112.

The client device 102 may contain a location share procedure 116 that facilities the on demand location sharing. The client device 102 may also contain a mapping procedure 120, a user interface procedure 122, and a messenger client application 126. The mapping procedure 120 facilitates the display of a map or other visual representations illustrating a desired location on the client device 102. The user interface procedure 122 facilitates retrieving input from the user of the client device 102 and displaying graphical menus, windows, and icons to the user of a client device 102. The messenger client application 126 may be used to facilitate the transmission of communication messages between the client devices 102. In an embodiment, the messenger client application 126 interacts with the messaging service 106 to transmit the communication messages to other client devices 102 coupled to the server device 104.

The location share procedure 116, the mapping procedure 120, and the user interface procedure 122 may be embodied in software, as programs, procedures, or modules, in hardware, or a combination thereof. In addition, the client device 102 may contain other computing components, such as a processor 124, a memory 128, and a communications interface 132. A more detailed description of the components of the system 100 is described below with respect to FIGS. 12-13.

Although the system 100 shown in FIG. 1 has a limited number of elements in a certain configuration, it should be appreciated that the system 100 may include more or less elements in alternate configurations. Furthermore, in various embodiments, the system 100 described herein may comprise a computer-implemented system having multiple components, programs, procedures, modules. As used herein these terms are intended to refer to a computer-related entity, comprising either hardware, a combination of hardware and software, or software. For example, a component may be implemented as a process running on a processor, a hard disk drive, multiple storage drives (of optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers as desired for a given implementation. The embodiments are not limited in this manner.

The various components of system 100 may be communicatively coupled via various types of communications medium as indicated by various lines or arrows. The components may coordinate operations between each other. The coordination may involve the uni-directional or bi-directional exchange of information. For instance, the components may communicate information in the form of signals communicated over the communications medium. The information may be implemented as signals allocated to various signal lines. In such allocations, each message is a signal. Further embodiments, however, may alternatively employ data messages. Such data messages may be sent various connections. Exemplary connections include parallel interfaces, serial interfaces, and bus interfaces.

Figure 2:
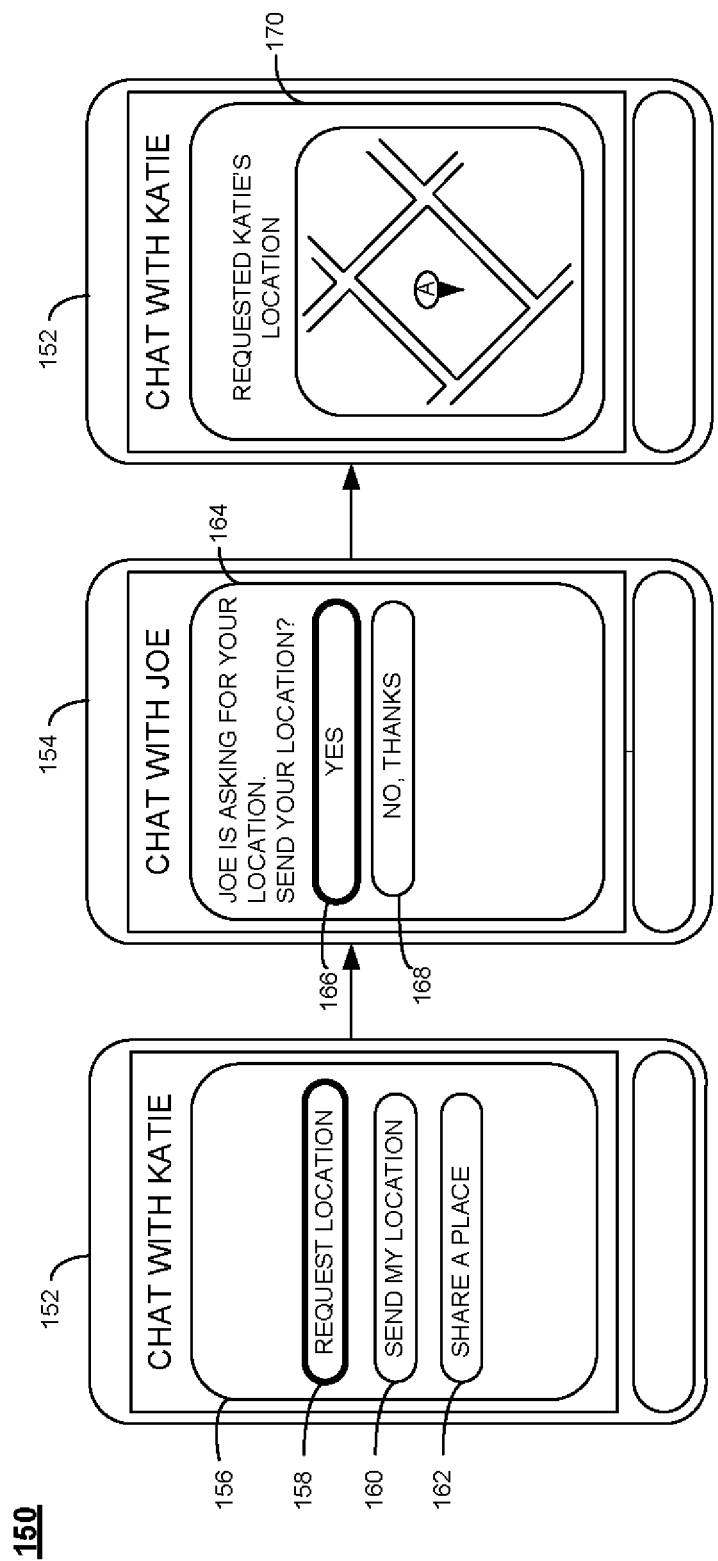
FIG. 2 illustrates an exemplary communication session for requesting a location of a client device in a system for on demand location sharing.

FIG. 2 illustrates an exemplary communication exchange 150 between a user, Joe, of a first client device 152 and a user, Katie, of a second client device 154. In this illustrated embodiment, the two users communicate through the exchange of instant messages. As shown, Katie and Joe are engaged in a text-based chat. Joe wishes to know Katie's location. A user interface 156 appears on the display of Joe's client device 152 providing him with several options. As shown, there may be a request location option 158, a share my location option 160, and a share place option 162. Joe activates the request location option 158 which engages the location share procedure 116 to transmit a location request message to Katie's client device.

Katie's client device receives the location request message which may be displayed 164 along with several menu options for a response back to Joe. Katie may select the YES option 166 which engages the location share procedure 116 to prepare and transmit an affirmative location response message containing Katie's location which is considered Katie's electronic consent. Alternatively, Katie may select the NO THANKS option 168 which may engage the location share procedure 116 to prepare and transmit a NO THANKS response message.

In the exemplary illustration in FIG. 2, Katie selects the YES option 166 and an affirmative location response message is transmitted to Joe's client device 152. Joe's client device 152 may engage the location share procedure 116 to display a map 170 or visual representation illustrating Kate's location.

Figure 3:
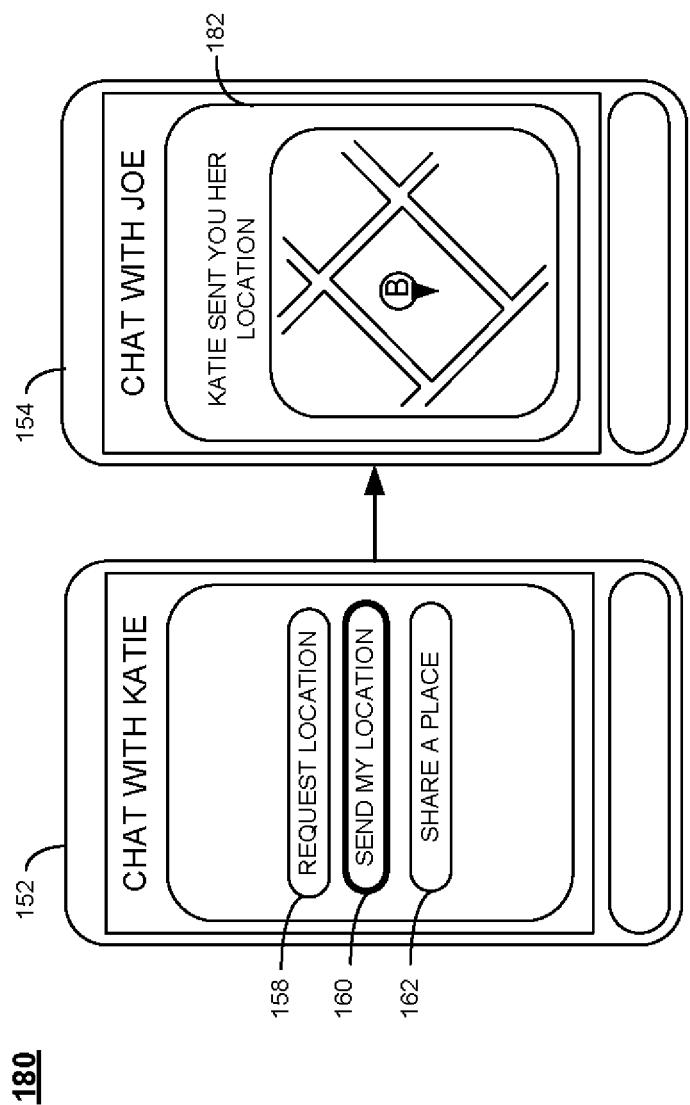
FIG. 3 illustrates an exemplary communication session for sending a location of a first client device to a second client device in a system for on demand location sharing.

FIG. 3 illustrates another exemplary communication exchange 180 between Katie and Joe. In this exchange, Joe wishes to share his location with Katie. Joe selects the send my location option 160 on his display which engages the location share procedure 116 to transmit to Katie's client device 154 his location. Katie's client device 154 receives the send my location message and the location share procedure 116 displays a map 182 illustrating Joe's location.

Figure 4:
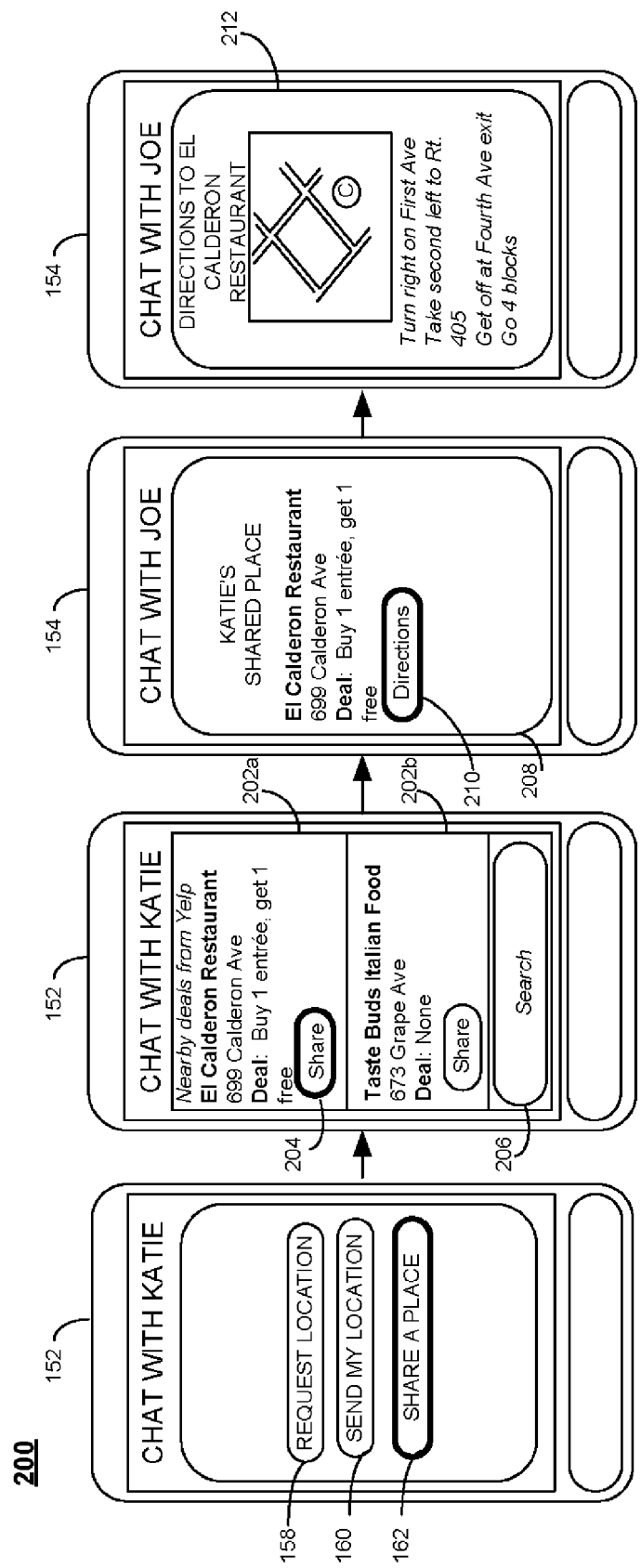
FIG. 4 illustrates an exemplary communication session for sharing a place in a system for on demand location sharing.

FIG. 4 illustrates another exemplary communication exchange 200 between Katie and Joe. In this exchange 200, Joe wishes to search for meeting places near Katie's location. Generally, a meeting place is anything that may be associated with a location, such as without limitation, churches, restaurants, coffee houses, a mailbox, stores, buildings, structures, a corner, etc. Joe activates the SHARE A PLACE option 162 which may find meeting places in the vicinity of Katie's location. The location share procedure 116 displays a description of each of the meeting places, along with information pertaining to current deals at these locations 202a, 202b. Joe has the option to select one or more of these suggested meeting places which he may share with Katie by activation of the SHARE option 204 that may be displayed with each suggested meeting place 202. Alternatively, Joe may enter search terms through a search window 206 that the location share procedure 116 utilizes in finding other meeting places.

Upon Joe's activation of the SHARE option 204, Katie's client device 154 may receive a listing of one or more suggested meeting places 208 along with a DIRECTIONS option 210. Upon Katie's activation of the DIRECTIONS option 210, the location share procedure 116 on Katie's client device 154 may display a map illustrating the location of the selected meeting place along with directions from Katie's location 212.

Although the communication exchanges shown in FIG. 2-4 have a limited number of elements in a certain arrangement, it should be appreciated that the communication exchanges may include more or less elements in alternate arrangements as desired for a given implementation. Furthermore, the names associated with each option and message (i.e., request location, send my location, and share a place) are used for illustration purposes and other terminology may be employed as desired for a given implementation.

Attention now turns to a more detailed description of the technology and techniques employed in the communication exchanges shown above.

Figure 5:
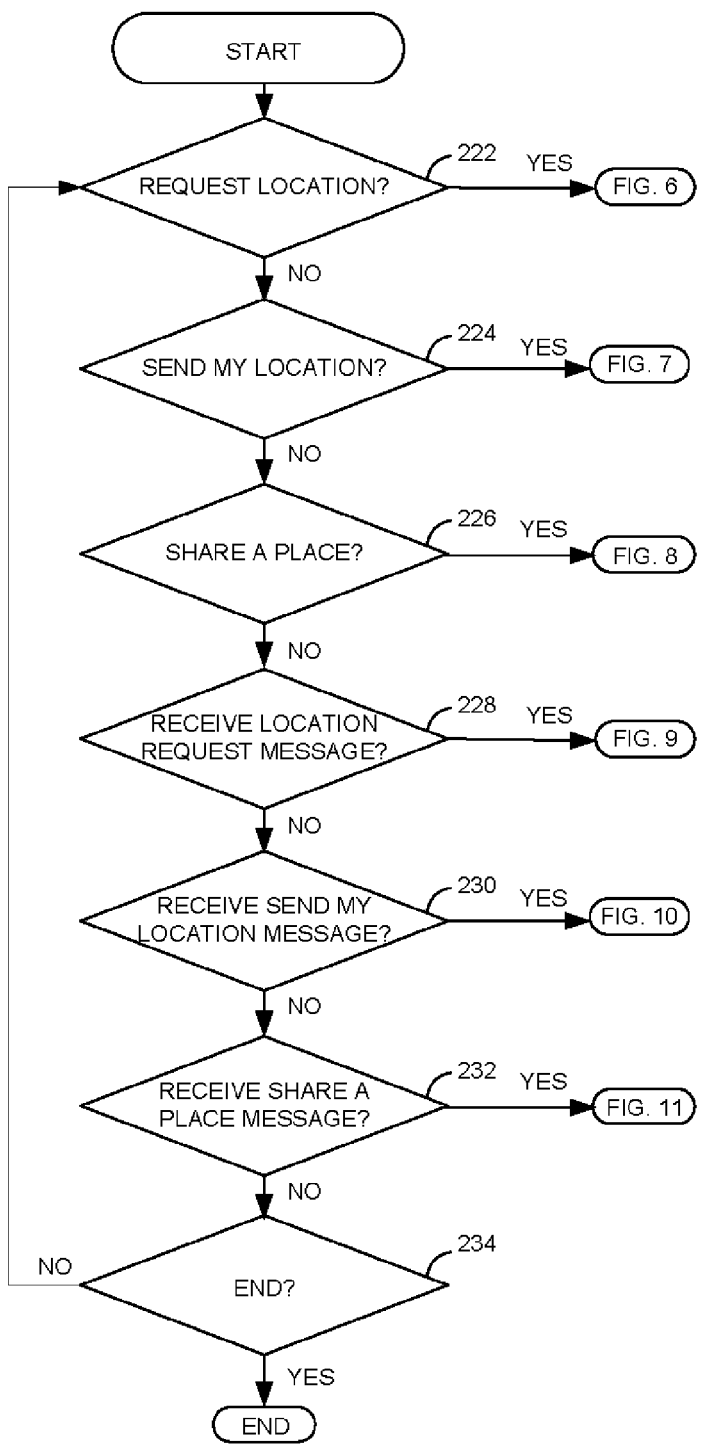
FIG. 5 illustrates an exemplary flow chart illustrating a process for on demand location sharing.

FIG. 5 illustrates an embodiment of a process flow 220 for the location share procedure 116. The process flow 220 may be representative of some or all of the operations executed by one or more embodiments described herein. In an embodiment, the user of the client device 102 may be actively engaged in a series of instant message exchanges with a trusted user, contact, buddy or friend that has been authenticated by the user of the client device 102 previously. A user wishing to learn the location of another user may initiate the location share procedure 116 through activation of an icon displayed on the client device 102, upon the receipt of an incoming message, or in any other manner that activates the location share procedure 116.

Upon activation of the location share procedure 116, a user interface 156, such as a menu may be displayed, as shown in FIG. 2, having a REQUEST LOCATION, SEND MY LOCATION, and SHARE A PLACE options 158, 160, 162. When the location share procedure 116 detects the selection of the REQUEST LOCATION option 158 (step 222—Yes), the location share procedure 116 operates the process flow shown in FIG. 6. Otherwise (step 222—No), if the selection of the SEND MY LOCATION option 160 is detected (step 224—Yes), the location share procedure 116 operates the process flow shown in FIG. 7. Otherwise (step 224—No), if the selection of SHARE A PLACE option 162 is detected (step 226—Yes), the location share procedure 116 operates the process flow shown in FIG. 8.

Figure 9:
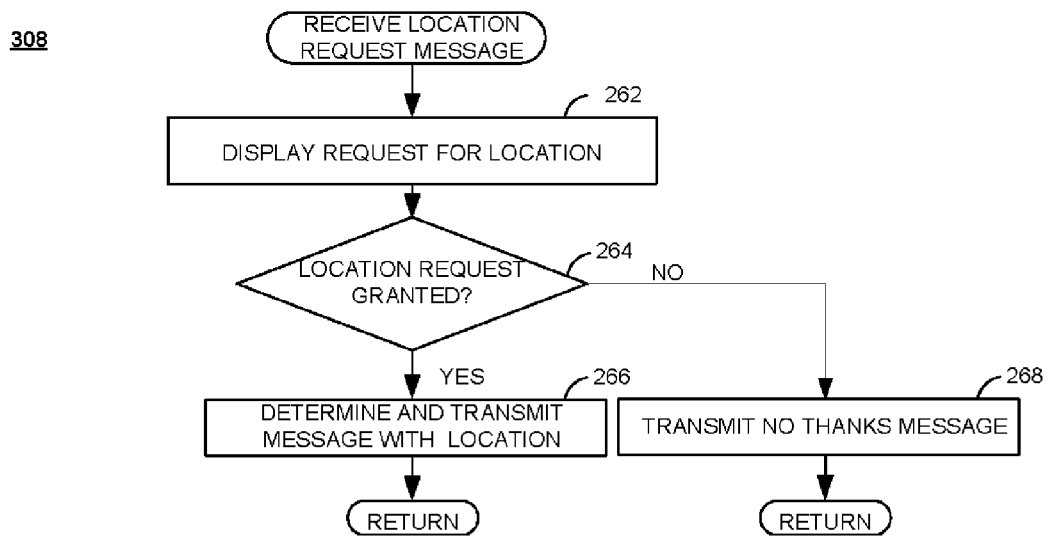
FIG. 9 illustrates an exemplary flow chart illustrating a process for receiving a location request message.

Otherwise (step 226—No), if the location share procedure 116 receives a location request message (step 228—Yes), the location share procedure 116 follows the process flow shown in FIG. 9. Otherwise (step 228—No), if the location share procedure 116 receives a send my location message (step 230—Yes), the location share procedure 116 follows the process flow shown in FIG. 10. Otherwise (step 230—No), if the location share procedure 116 receives a share a place message (step 232—Yes), the location share procedure 116 follows the process flow shown in FIG. 11. The process flow polls continuously for these events (step 234—No) until a termination event occurs which ends the operation of the location share procedure 116 (step 234—Yes).

Figure 6:
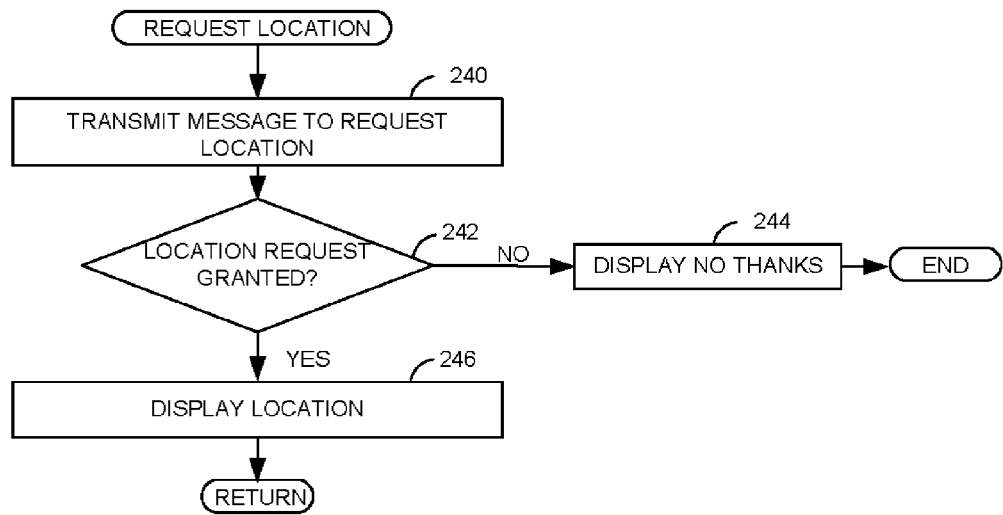
FIG. 6 illustrates an exemplary flow chart illustrating a process for requesting a location.

FIG. 6 illustrates an embodiment of a process flow 300 for generating a REQUEST LOCATION message. The location share procedure 116 may prepare a request location message to the user of a client device. A messenger client application 126 may be used to facilitate transport of the request location message to the user of the other client device. If the user of the other client device responds with an affirmative response message or electronic consent (step 242—Yes), the location share procedure 116 may utilize the mapping procedure 120 and the user interface procedure 122 to display a map or visual representation showing the location (step 246). Otherwise, if the user receives a NO THANKS message (step 242—No), then the location share procedure 116 may utilize the user interface procedure to display the NO, THANKS message (step 224). In either event, the process flow returns to FIG. 5.

Figure 7:
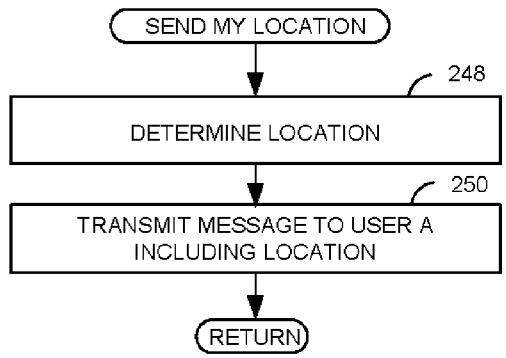
FIG. 7 illustrates an exemplary flow chart illustrating a process for sending a location.

FIG. 7 illustrates an embodiment of a process flow 302 for generating a SEND MY LOCATION message. In this illustration, it is assumed that a first client device is sending their location to a second client device. The location share procedure 116 may determine the location of the first client device in any number of ways (step 248). If the client device is equipped with a satellite receiver, the location share procedure 116 may obtain the coordinates of the first client device's location from a satellite receiver which is then transmitted in a send location request message to the second client device. Alternatively, the location share procedure 116 may determine the location of the first client device through communications between the first client device and a neighboring cell tower or access point. In either case, a send my location message with the first client device's location is transmitted to the second client device (step 250).

Figure 8:
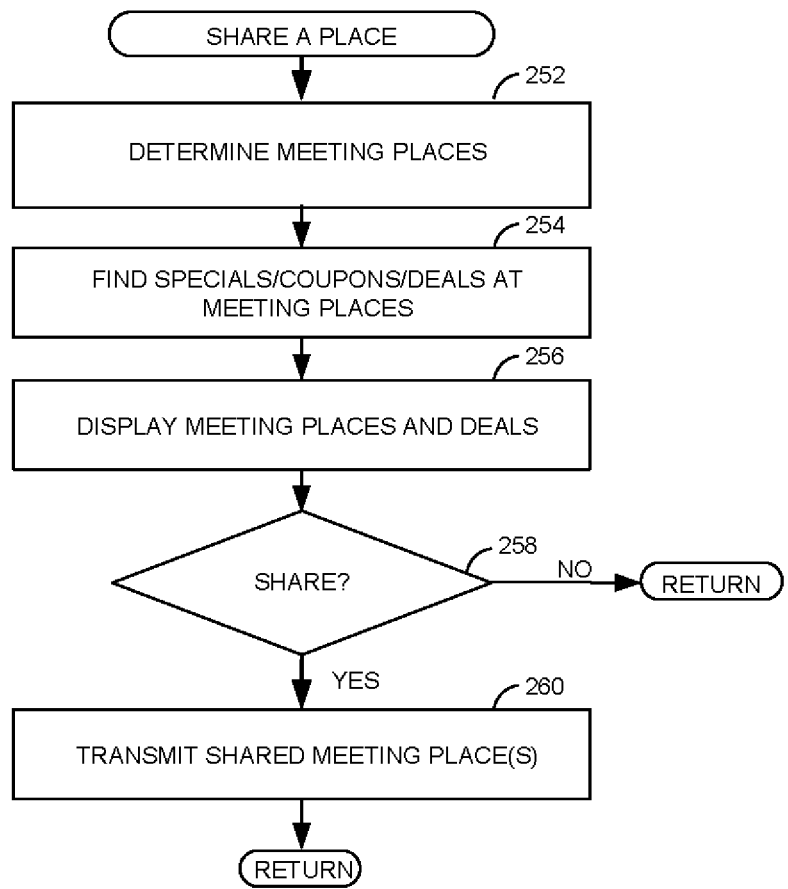
FIG. 8 illustrates an exemplary flow chart illustrating a process for sharing a place.

FIG. 8 illustrates an embodiment of a process flow for generating a SHARE A PLACE message. In this illustration, it is assumed that a first client device is sharing a place with a second client device. Upon the user activating the SHARE A PLACE option 162 on the display, the location sharing procedure 116 may determine meeting places within the vicinity of the second client device's location. The location sharing procedure 116 may communicate with a web server to perform a search for such meeting places (step 252). Examples of such web servers, include but are not limited to Yelp.com, Bing.com, and the like. In addition, the location share procedure 116 may instruct the web server to search for deals, coupons and specials currently offered at the suggested meeting places (step 254). The suggested meeting places and related descriptions may be displayed to the first client device (step 256). The user of the first client device then has the capability to select one or more of the suggested meeting places by activating the SHARE A PLACE option 162 for each suggested meeting place. Each selected suggested meeting place (step 258—Yes) may then be transmitted in a share a place message that may be transmitted to the second client device (step 260). Then, the process flow returns to FIG. 5.

FIG. 9 illustrates the process flow 308 of the location share procedure 116 when a client device receives a location request message from another client device. The location share procedure 116 may display a message indicating that a user is requesting their location (step 262). The user of the client device may elect to share the location or not. If the location request is granted (i.e. electronic consent) (step 264—Yes), the location may be determined and transmitted back to the requesting client device (step 266). Otherwise (step 264—No), a NO THANKS message may be transmitted back to the requesting client device (step 268).

Figure 10:
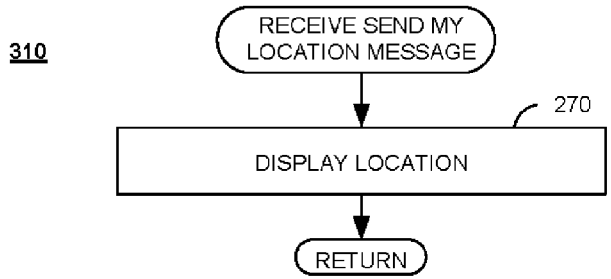
FIG. 10 illustrates an exemplary flow chart illustrating a process for receiving a send my location message.

FIG. 10 illustrates the process flow 310 of the location share procedure 116 when a client device receives a SHARE MY LOCATION message from another client device. The location share procedure 116 may utilize the mapping procedure 120 and the user interface procedure 122 to generate a map with the location of the other client device's location which is then may be displayed (step 270). The process flow then returns to FIG. 5.

Figure 11:
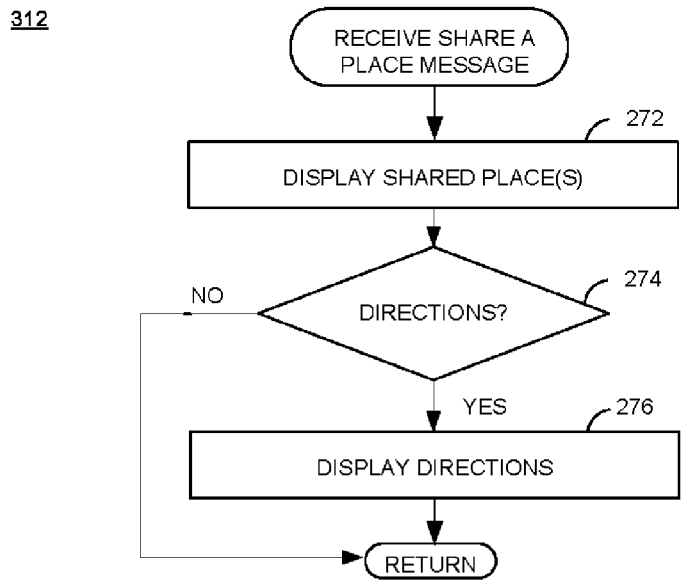
FIG. 11 illustrates an exemplary flow chart illustrating a process for receiving a share a place message.

FIG. 11 illustrates the process flow 312 of the location share procedure 116 when a client device receives a SHARE A PLACE message from another client device. The location share procedure 116 may display the suggested meeting places contained in the message and may display a directions option with each suggested meeting place (step 272). If the user of the receiving client device activates the directions option for a selected suggested meeting place (step 274—Yes), then directions may be obtained and displayed along with a map of the suggested meeting place. The location share procedure 116 may obtain the directions and/or a corresponding map from a web server. The obtained directions and corresponding map may then be displayed on the client device (step 276) and the process flow then returns to FIG. 5.

It should be noted that the process flow illustrated in any one of FIGS. 5-11 has a limited number of elements in a certain arrangement and that the process flows may include more or less elements in alternate arrangements as desired for a given implementation. Attention now turns to a more detailed description of the computing environment for the on demand location sharing system described herein.

Figure 12:
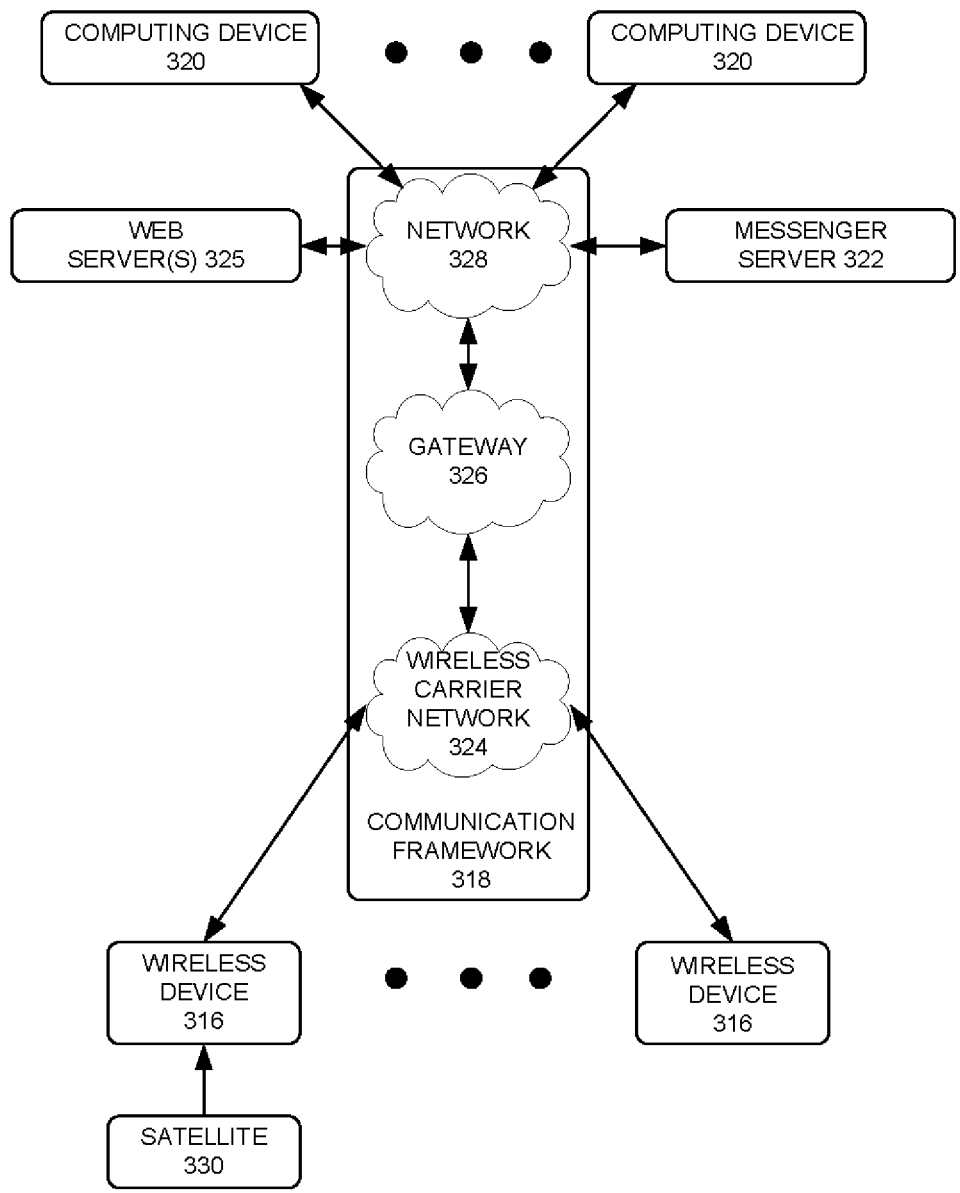
FIG. 12 illustrates an exemplary block diagram of a computing environment for on demand location sharing.

Referring now to FIG. 12, there is shown a schematic block diagram of an exemplary computing environment 314 for on demand location sharing. The environment 114 includes one or more wireless device(s) 316 in communication through a communications framework 318 with other wireless device (s) 316, computing devices 320, a messenger server 322, and one or more web servers 325. The client devices 102 may be implemented as wireless device(s) 316 and/or computing devices 320 and embodied in a hardware device, a software module, or as a combination thereof. Examples of such hardware devices may include, but are not limited to, a computer (e.g., server, personal computer, laptop, etc.), a cell phone, a personal digital assistant, or any type of computing device, and the like having the capability of wireless communication. The wireless devices 316 and/or the computing devices 320 may also be embodied as a software module having instructions that communicate over a wireless communication medium. The wireless devices 316 may be in communication with one or more satellites 330 from which the wireless device may directly obtain radio signals to determine a location.

The messenger server 322 and the web server(s) 325 may be embodied in a hardware device or a software module, or as a combination thereof. Examples of such hardware devices may include, but are not limited to, a computer (e.g., server, personal computer, laptop, etc.), a cell phone, a personal digital assistant, or any type of computing device, and the like having the capability of communicating with a communication medium. The messenger server 322 and the web server(s) 325 may also be embodied as a software module having instructions that communicate through a communication medium. The server device 104 may be implemented as a messenger server 322 capable of facilitating any type of messaging service, such as electronic mail, instant messaging, or short message service messages, text messages, and the like.

The communications framework 318 facilitates communications between the devices and servers connected therewith. The communications framework 318 may be embodied utilizing any combination of communication mediums and networking structures, such as wired or wireless networks, utilizing any type of communication protocols. In an embodiment, the communications framework 318 may include a wireless carrier network 324, a gateway 326, and a network 328. The wireless carrier network 324 facilitates wireless communication between the wireless devices 316. The wireless carrier network 324 may be coupled to a gateway 326 which in turn is coupled to one or more networks 328. The gateway 326 facilitates communication between different networks. The network 328 facilitates communication between the computing devices 320 in communication therewith and the wireless devices 316. One or more networks 328 may be coupled to the gateway 326 using any type of communication medium or combination thereof, such as wired or wireless communication mediums. The messenger server 322 and the web server 325 may be coupled to a network 328 through any type of communication medium or combination thereof, such as wired or wireless communication mediums.

It should be appreciated that the computing environment shown in FIG. 12 may include less or more components in alternate arrangements as desired for a given implementation.

Figure 13:
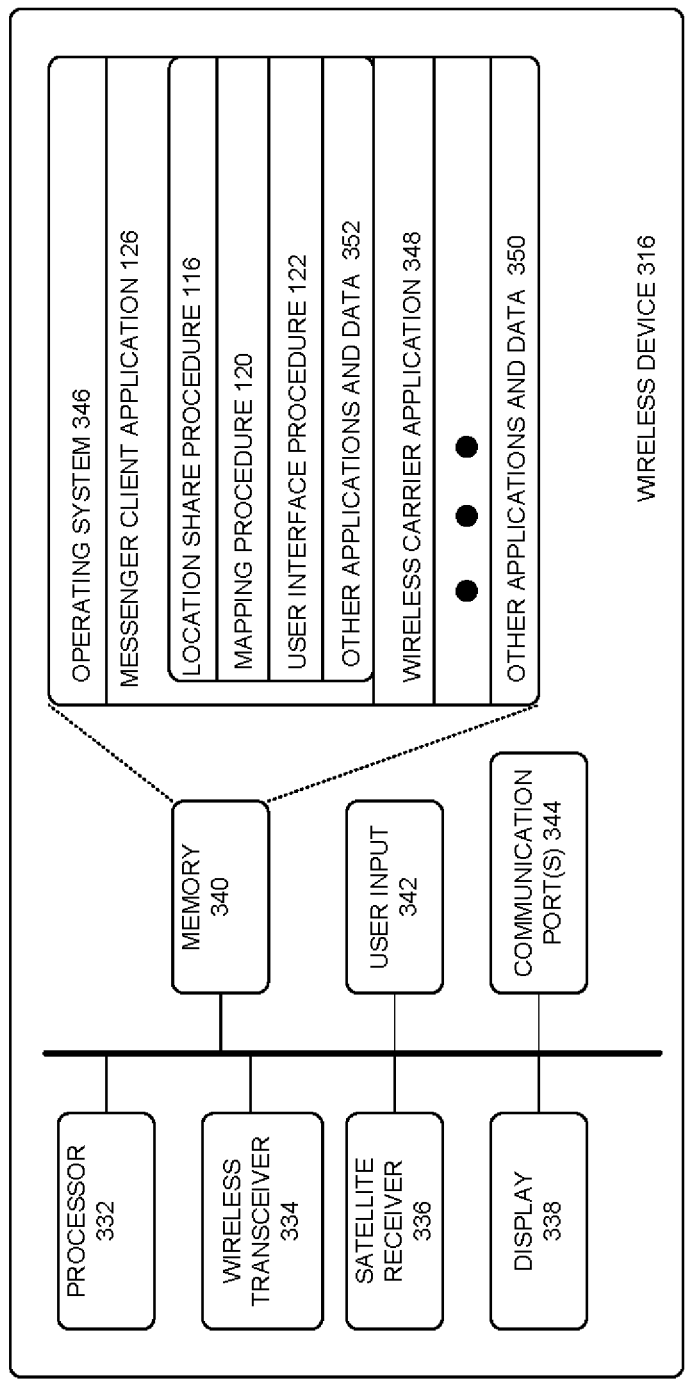
FIG. 13 illustrates an exemplary block diagram of a wireless device implementation.

FIG. 13 illustrates a block diagram of a wireless device 316. In an embodiment, the wireless device 316 may include a processor 332, a wireless transceiver 334, a memory 340, one or more communication ports 344, a display 338, and a user input mechanism 342. The user input mechanism 342 may contain one or more buttons, a keyboard, or any other type of mechanism that facilitates user input to the wireless device 316. The display 338 may be a touch screen display configured to visually display information and to detect and accept user input responses transmitted through the touch at a location on the display. Optionally, the wireless device 316 may include a satellite receiver 336 for receiving satellite communications used to determine and track the wireless device's geophysical location.

The memory 340 may be a computer readable medium or storage medium that may store executable procedures, applications, and data. It may be any type of memory device (e.g., random access memory, read-only memory, etc.), magnetic storage, volatile storage, non-volatile storage, floppy, disk, drive, tape, optical storage, DVD, CD, and the like. The memory 340 may also include one or more external storage devices or remotely located storage devices. The memory 340 may contain instructions and data as follows:
    an operating system 346;
    a messenger client application 126 having:
        location share procedure 116;
        mapping procedure 120;
        user interface procedure 122; and
        various other procedures and data 352.
    a wireless carrier application 348 that facilitates communications with the wireless carrier network 324; and
    various other applications and data 350.

Likewise, the wireless device shown in FIG. 13 may include less or more components in alternate arrangements as desired for a given implementation. For example, in one or more embodiments, the location share procedure 116 may not be part of a messenger client application and can be a separate program that executes independent of the messenger client application 126. Alternatively, in another embodiment, one or more processes of the location share procedure 116 may be implemented in the messenger client application 126 while others are implemented independent of the messenger client application 126.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writable or re-writeable memory, and so forth. Examples of the logic may include various software elements, such as software components, programs, procedure, applications, computer programs, application programs, system programs, machine programs, operating system software, middleware, firmware, software modules, routines, subroutines, functions, methods, software interfaces, application program interfaces (API), instruction sets, computing code, computer code, code segments, computer code segments, words, values, symbols, or any combination thereof. In one embodiment, for example, an article of manufacture may store executable computer program instructions, that when executed by a computer, cause the computer to perform methods and/or operations in accordance with the described embodiments. The executable program instructions may include any suitable type of code, such as source code, complied code, interpreted code, executable code, static code, dynamic code, and the like. The executable program instructions may be implemented according to a predefined computer language, manner or syntax, for instructing a computer to perform a certain function. The instructions may be implemented in any suitable high-level, low-level, object-oriented, visual, compiled and/or interpreted programming language.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, comprising:
configuring a first user device to only distribute a location associated with the first user device upon authorization by a first user of the first user device;
receiving, by the first user, a location request message requesting the location of the first user device, the location request message sent from a second user from a second user device;
displaying the received location request message along with a first option that is configured to authorize the location request;
when the first user selects the first option, transmitting an affirmative response message including the location of the first user device;
in response to the transmitted affirmative response message, receiving a first message having at least one meeting place that is near a location of the first user device and at least one deal associated with the at least one meeting place, the meeting place different from the location of the first user device and the location of the second user device; and
displaying the at least one meeting place and the at least one deal along with a second option that is configured to display directions to the at least one meeting place from the location of the first user device when activated by the first user.

2. The method of claim 1, further comprising:
in response to activation of the second option, displaying a map illustrating the location of the at least one meeting place and instructions to the location of the at least one meeting place.

3. The method of claim 1, further comprising:
displaying a third option along with the received location request message, the third ption denying the location request; and when the first user selects the third option, transmitting a second message to the second user indicating denial of the location request.

4. The method of claim 1, further comprising:
receiving a third message from a third user including a map of a location of the third user.

5. The method of claim 1, further comprising:
displaying a plurality of options during a communication exchange between the first user and the second user, the plurality of options including one or more of a request location option, a send my location option, and a share a place option.

6. The method of claim 1, further comprising:
communicating between the first user device and the second user device using at least one of a short message service or an instant message application.

7. The method of claim 1, further comprising:
communicating between the first user device and the second user device through a wireless communications medium.

8. The method of claim 1, wherein the location represents a geophysical location.

9. The method of claim 1, comprising:
transmitting a location request message to a third user; and
in response to the transmitted location request message, receiving a map including the location of the third user.

10. The method of claim 9, comprising:
searching for a second meeting place located between a location of the first user and the location of the third user; and
transmitting the second meeting place to the third user.

11. An apparatus, comprising:
a wireless transceiver configured to transmit and receive electronic messages between a first user of a first wireless device and a second user associated with the apparatus;
a processor coupled to the wireless transceiver; and
a memory coupled to the processor including a messenger client application that is configured to:
transmit a first message to the first user requesting the location of the first user, the location of the first user only distributed to other users when the first user responds affirmatively to the first message;
receive the location of the first user;
search for one or more meeting places that is near the location of the first user, the at least one meeting place different from the location of the first user and the location of the second user;
search for at least one deal associated with the at least one meeting place;
display search results including the at least one meeting place and the associated at least one deal;
select one of the at least one meeting places; and
transmit a second message including the selected one of the at least one meeting places and the at least one deal to the first user.

12. The apparatus of claim 11, wherein the search for one or more meeting places is further configured to:
access a web server to search for the at least one meeting place using the location of the first user.

13. The apparatus of claim 11, further comprising:
a satellite receiver configured to determine the location of the apparatus.

14. The apparatus of claim 11, wherein the received location of the first user is displayed on a map.

15. The apparatus of claim 11, wherein the search for the at least one meeting place is initiated by the second user upon activating a share a place option.

16. The apparatus of claim 11, wherein the location of the apparatus is determined using ratio signal transmissions.

17. A device, comprising:
  at least one processor and a memory; and
  the processor configured to:
    distribute a location of the device to other users only when a first user of the device responds affirmatively to a location request message requested by another user;
    receive a location request message requesting a location of the device from the second user;
    display the received location request message with at least one option that is configured to generate an affirmative response to the location request message;
    when the first user selects the at least one option, generate and transmit the affirmative response message to the second user;
    in response to the transmitted affirmative response message, receive a first message having at least one meeting place that is near a location of the device and at least one deal associated with the at least one meeting place, the at least one meeting place different from the location of the device and the location of the second user; and
    display the at least one meeting place and the at least one deal along with a second option that is configured to display directions to the at least one meeting place from the location of the first user device when activated by the first user.

18. The device of claim 17, wherein the processor is further configured to:
  display a third option along with the received location request message, the third option denying the location request; and
  when the first user selects the third option, transmitting a second message to the second user indicating denial of the location request.

19. The device of claim 17, wherein the processor is further configured to:
  initiate a location request message to a third user; and
  receive a map including the location of the third user during a messaging session with the third user.

20. The device of claim 19, wherein the processor is further configured to:
  search for a second meeting place located between a location of the first user and the location of the third user; and
  transmit the second meeting place to the third user.

\* \* \* \* \*